US010070136B2

(12) United States Patent
Seigneurbieux (10) Patent No.: US 10,070,136 B2
(45) Date of Patent: Sep. 4, 2018

(54) STATISTICAL MULTIPLEXING WITH HETEROGENEOUS ENCODER POOL

(71) Applicant: ARRIS Enterprises LLC, Suwanee, GA (US)

(72) Inventor: Pierre Seigneurbieux, Mountain View, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 255 days.

(21) Appl. No.: 15/044,240

(22) Filed: Feb. 16, 2016

(65) Prior Publication Data

US 2017/0237987 A1 Aug. 17, 2017

(51) Int. Cl.
*H04N 19/146* (2014.01)
*H04N 19/149* (2014.01)
*H04N 21/2365* (2011.01)

(52) U.S. Cl.
CPC ......... *H04N 19/146* (2014.11); *H04N 19/149* (2014.11); *H04N 21/23655* (2013.01)

(58) Field of Classification Search
CPC ............... H04N 19/146; H04N 19/149; H04N 21/23655
USPC .................................................... 375/240.02
See application file for complete search history.

(56) References Cited

U.S. PATENT DOCUMENTS 6,643,327 B1 11/2003 Wang
7,418,007 B1 8/2008 Liu et al.
2010/0118888 A1* 5/2010 Picco ................... H04J 3/0682
370/468
2013/0070839 A1* 3/2013 Magee ................ H04L 65/4076
375/240.02
2013/0101052 A1* 4/2013 Kaye ................ H04N 21/23655
375/240.26
2014/0112384 A1* 4/2014 Van Veldhuisen ..........................
H04N 21/23655
375/240.02

FOREIGN PATENT DOCUMENTS

WO 2005022796 A3 6/2005

OTHER PUBLICATIONS

PCT Search Report & Written Opinion, Re: Application No. (PCT/US2017/014992), dated Mar. 22, 2017.

(Continued)

*Primary Examiner* — Jamie Atala
*Assistant Examiner* — Kathleen Nguyen
(74) *Attorney, Agent, or Firm* — Thomas A. Ward (57) ABSTRACT

A method of statistical multiplexing digital video is provided enabling use of an encoder pool. The method includes loading a mapping curve into memory at a statistical multiplexor controller (SMC) for each of a plurality of encoders in a heterogeneous encoder pool, each mapping curve being specific to a type and/or configuration of encoder and associating target bitrates with need parameter values, receiving a need parameter value at the SMC from each encoder in the heterogeneous encoder pool, determining a target bitrate associated with each need parameter value received at the SMC, by looking up target bitrates for each need parameter on mapping curves specific to each encoder in the heterogeneous encoder pool, and sending the target bitrate from the SMC to each encoder in the heterogeneous encoder pool in a bitrate assignment.

13 Claims, 4 Drawing Sheets

(56) References Cited

OTHER PUBLICATIONS

I. Trow, "Video Distribution Networks Using Remote Statistical Multiplexing", SMPTE—Motion Imaging Journal, Society of Motion Picture and Television Engineers, White Plains, NY, US, vol. 117, No. 1, Jan. 1, 2008, pp. 37-41, XP001563304, ISSN: 0036-1682, the whole document, pp. 37-39, fig. 2.

\* cited by examiner

STATISTICAL MULTIPLEXING WITH HETEROGENEOUS ENCODER POOL

TECHNICAL FIELD

The present disclosure relates to the field of digital video encoding, particularly statistical multiplexing with a heterogeneous pool of video encoders.

BACKGROUND

Statistical multiplexing is often used to control the bitrates of multiple digitally encoded video programs such that the total aggregate bitrate of all the programs is held substantially constant. Although the total bitrate across all the programs can stay substantially the same at any point in time, the proportion of the total bitrate used to encode each individual program can change over time depending on the complexity level of each program.

For example, a statistical multiplexor that has four encoders can separately encode four different video programs at the same time. If all four programs have the same complexity level at a particular point in time, 25% of a total bitrate can be assigned to each of the four encoders. However, if at another point in time one program has a high complexity level, two programs have a medium complexity level, and the last program has a low complexity level, the statistical multiplexor can change the proportional bitrate assignments to provide more of the total bitrate to the most complex program and less of the total bitrate to the least complex program, such as assigning 30% of the total bitrate to the most complex program, 20% of the total bitrate to the least complex program, and 25% of the total bitrate to each of the other two programs with a medium complexity level. As such, a statistical multiplexor can keep the overall bitrate substantially constant, but vary the bitrates of each individual program over time depending on the relative complexity levels of the programs.

Most statistical multiplexing is traditionally done in a closed system in which a controller allocates bitrates proportionally among a plurality of known encoders. Generally, all of the encoders are set to encode video using the same codec, in the same format, at the same framerate, using the same type of hardware or software implementation. Each encoder generally reports a need parameter, a measure of how complex their current scene is, to the controller such that the controller can directly compare the need parameters from each encoder to determine the bitrate to assign to each.

However, this type of conventional closed system does not allow statistical multiplexing with an encoder pool that includes encoders of varying types and/or configurations. In such systems, the controller is generally preconfigured with a single encoder profile that indicates the optimal bitrate to assign for each complexity value. However, that bitrate may not be appropriate for different types or configurations of encoders that may report their complexity values on different scales, or need more or less bits to encode frames at a similar quality level due to differences in hardware or software processing and/or settings such as video framerate or resolution.

SUMMARY

What is needed is a statistical multiplexor controller that can use mapping curves that are specific to each type and/or configuration of encoder to assign bitrates based on need parameters received from each encoder. The statistical multiplexor controller should be configured to load mapping curves for recognized encoders, and learn mapping curves for new unrecognized encoders, such that it can assign bitrates to any type and/or configuration of encoder in a heterogeneous encoder pool.

In one embodiment, the present disclosure provides for a method of statistical multiplexing digital video, the method comprising loading a mapping curve into memory at a statistical multiplexor controller for each of a plurality of encoders in a heterogeneous encoder pool, each mapping curve being specific to a type and/or configuration of encoder and associating target bitrates with need parameter values, receiving a need parameter value at the statistical multiplexor controller from each encoder in the heterogeneous encoder pool, determining a target bitrate associated with each need parameter value received at the statistical multiplexor controller, by looking up target bitrates for each need parameter on mapping curves specific to each encoder in the heterogeneous encoder pool, and sending the target bitrate from the statistical multiplexor controller to each encoder in the heterogeneous encoder pool in a bitrate assignment.

In another embodiment, the present disclosure provides for a statistical multiplexing system, the system comprising a plurality of encoders in a heterogeneous encoder pool configured to accept encoders of any type and/or configuration, each of the plurality of encoders being configured to encode a different input video into an output stream, a statistical multiplexor controller in remote and/or direct communication with each of the plurality of encoders, the statistical multiplexor controller being configured to load a mapping curve specific to each of the plurality of encoders that relates target bitrates to need parameter values, receive need parameters from each of the plurality of encoders that indicate a complexity level of the encoder's input video, and send a bitrate assignment to each of the plurality of encoders in response to receipt of a need parameter, each bitrate assignment indicating a target bitrate from a particular mapping curve specific to a particular encoder that is associated with a particular need parameter value received from that particular encoder.

BRIEF DESCRIPTION OF THE DRAWINGS

Further details of the present invention are explained with the help of the attached drawings in which.

DETAILED DESCRIPTION

Figure 1:
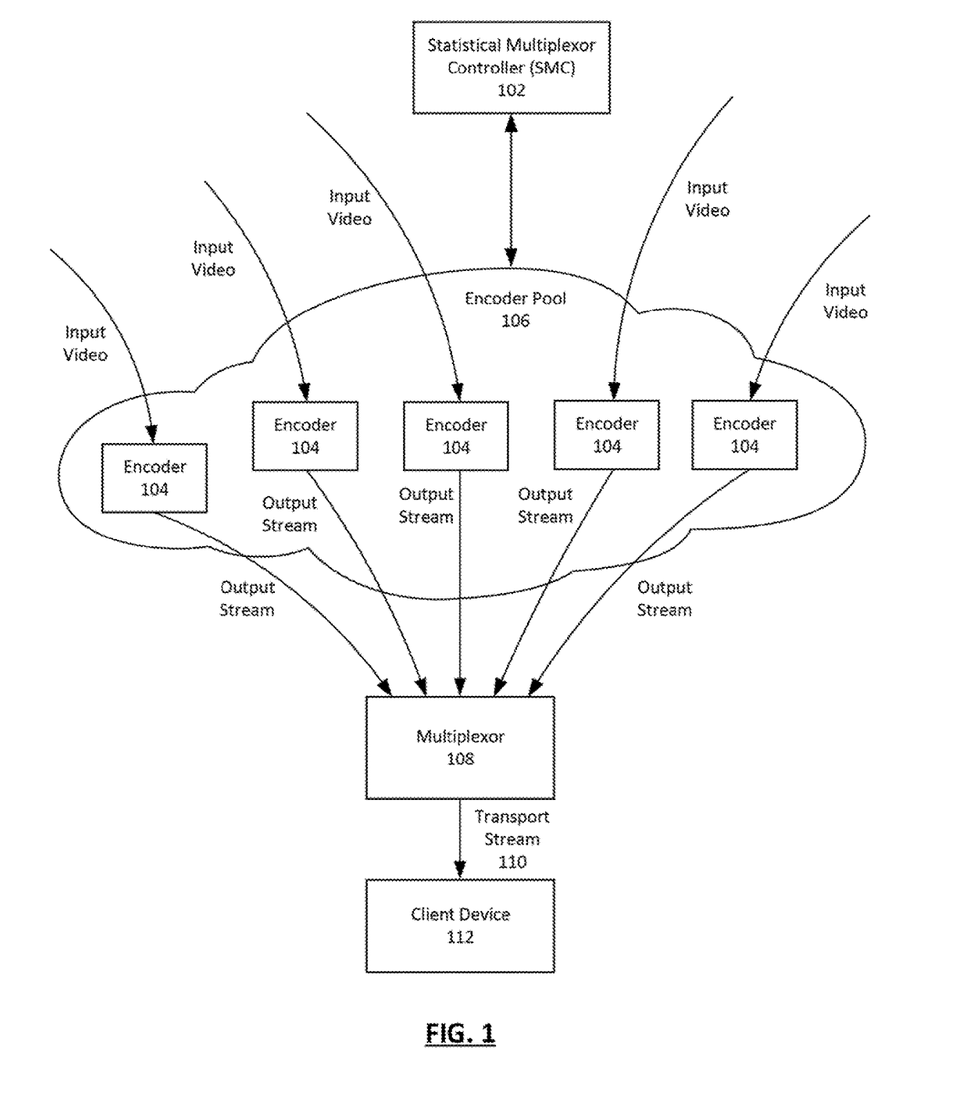
FIG. 1 depicts a statistical multiplexing system comprising a statistical multiplexor controller (SMC) in data communication with one or more encoders in an encoder pool.

FIG. 1 depicts a statistical multiplexing system comprising a statistical multiplexor controller (SMC) 102 in data communication with one or more encoders 104 in an encoder pool 106. The encoder pool 106 can comprise remote encoders 104 connected to the SMC 102 over the internet or other data network, and/or local encoders 104 directly coupled with the SMC 102. Each encoder 104 can encode, transcode, and/or compress a different input video into an output stream. The output streams can be combined by a multiplexor 108 into a transport stream 110, such as an MPEG transport stream. The transport stream 110 can be sent to client devices 112 such that each client device 112 can tune in to specific channels by decoding an output stream in the combined transport stream 110 that correspond to the desired channel.

The SMC 102 can comprise hardware and/or software configured to manage and/or coordinate activities of the encoders 104 in the encoder pool 106. As such, the SMC 102 can be in periodic communication with each of the encoders 104 in the encoder pool 106. The SMC 102 can comprise processors, memory, circuits, and/or other hardware and software elements. In some embodiments, the SMC 102 can be a dedicated hardware device. In other embodiments the SMC 102 can be, or use, software running on other hardware such as servers, computers, or video processing devices. In some embodiments the SMC 102 can comprise or be linked to the multiplexor 108, while in other embodiments the SMC 102 and multiplexor 108 can be separate components.

Each encoder 104 in the encoder pool 106 can be a video encoder and/or transcoder configured to encode, transcode, and/or compress an input video into an output stream. Each encoder 104 can comprise processors, memory, circuits, and/or other hardware and software elements. In some embodiments, an encoder 104 can be a dedicated hardware device. In other embodiments an encoders 104 can be, or use, software programs running on other hardware such as servers, computers, or video processing devices. Each encoder 104 can receive its input video from a source. By way of a non-limiting example, an encoder 104 can receive an input video over a network or other data connection from a broadcaster, content provider, or any other source. By way of another non-limiting example, the input video can be a file loaded to an encoder 104 from a hard disk or other memory storage device connected to the encoder 104.

The encoder pool 106 can be heterogenenous, such that encoders 104 of any type or configuration can be a part of the encoder pool 106. While in some cases each encoder 104 in the encoder pool 106 can be of the same type or configuration, the encoder pool 106 can comprise encoders 104 of different types or configurations, such as encoders 104 of different hardware types or product generations, software encoders 104, hardware encoders 104, virtual encoders 104, encoders 104 configured to encode video using different codecs, encoders 104 configured to encode video into different formats, aspect ratios, frame rates, and/or resolutions, and/or encoders 104 that differ in any other attribute or configuration.

Each encoder 104 in the encoder pool 106 can process a different input video, such as video from different programs and/or channels. The output streams generated by the encoders 104 can be combined by a multiplexor 108 into a transport stream 110. The transport stream 110 can be transmitted to client devices 112 such as cable boxes, televisions, or other devices. By way of a non-limiting example, different encoders 104 in the encoder pool 106 can each encode a different video program or channel, and the resulting encoded output streams can be sent together in an MPEG transport stream to cable boxes. In this example, each cable box can then extract and decode portions of the MPEG transport stream corresponding to a particular program or channel that a user wants to watch.

The SMC 102 can communicate with the encoders 104 in the encoder pool 106 to manage the total bitrate of the combined transport stream 110, by at least partially controlling the bitrate of the output stream generated by each encoder 104. The SMC 102 can be configured with a target aggregate bitrate for the transport stream 110, and the SMC 102 can allocate portions of that target aggregate bitrate among each encoder 104 in the encoder pool 106 such that the combined bitrate of all the output streams produced by the encoders 104 remains at or below the target aggregate bitrate for the transport stream 110. By way of a non-limiting example, the target aggregate bitrate can be set at a bitrate that can be delivered fully to downstream client devices 112 over currently available bandwidth and/or network conditions.

Figure 2:
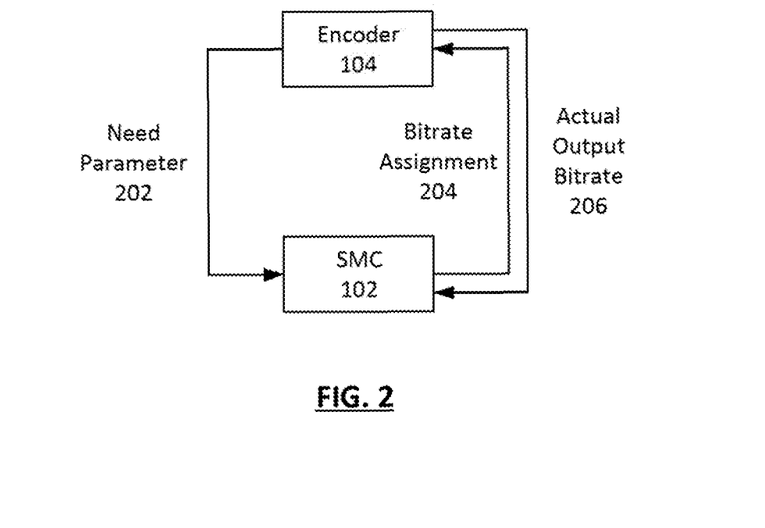
FIG. 2 depicts an example of the SMC's communication with a single encoder.

FIG. 2 depicts an example of the SMC's communication with a single encoder 104, although the SMC 102 can be in periodic communication with all of the encoders 104 in the encoder pool 106. The SMC 102 can keep ports and/or network addresses open to exchange data with encoders 104. By way of a non-limiting example, in some embodiments the SMC 102 can maintain a multicast IP address through which it can receive communications from encoders 104 that are in the encoder pool 104 or that are attempting to join the encoder pool 104.

As shown in FIG. 2, the SMC 102 can periodically receive a need parameter 202 from each encoder 104 in the encoder pool 106. In some embodiments, the SMC 102 can receive need parameters 202 from the encoders 104 on a frame by frame basis, such that each encoder 104 can send a new need parameter 202 to the SMC 102 each time it processes a new frame of its input video. In other embodiments, the encoders 104 can periodically send new need parameters 202 to the SMC 102 at predetermined time intervals.

The value of each need parameter 202 sent by an encoder 104 can indicate the complexity of the encoder's input video at the time it sent the need parameter 202 to the SMC 102. By way of a non-limiting example, when need parameters 202 are sent by the encoders 104 on a frame by frame basis, each need parameter 202 from an encoder 104 can indicate the complexity of the next frame that will be encoded by the encoder 104. As will be described in more detail below, the SMC 102 can use the need parameters 202 received from each encoder 104 in the encoder pool 106 to allocate portions of the target aggregate bitrate for the transport stream 110 to each encoder 104. The SMC 102 can transmit a bitrate assignment 204 to each encoder 104 that indicates the bitrate allocated to the encoder 104 for encoding a single frame or a sequence of frames.

By way of a non-limiting example, the SMC 102 can be set with a target aggregate bitrate for the transport stream 110 that is defined by the maximum bitrate that can be transported to receiving client devices 112 over currently available bandwidth and/or network conditions, such that each client device 112 can receive the entire transport stream 110. The SMC 102 can provide bitrate assignments 204 to each encoder 104 based on values of the need parameters 202 received from each encoder 104, such that the aggregate total of all the bitrate assignments 204 is substantially equal to the target aggregate bitrate for the transport stream 110. By way of a non-limiting example, the SMC 102 can attempt to keep the aggregate total of all the bitrate assignments 204 as close to the target aggregate bitrate as possible.

Although input videos being encoded by different encoders 104 in the encoder pool 106 can vary in complexity compared to one another at any single point in time, their relative complexities can also change over time. By way of a non-limiting example, at one moment an encoder 104 can be encoding a complex climactic scene of a movie with lots of action and detail, but shortly thereafter be encoding a comparatively simple end credit scene that is primary a black screen with white text. When an encoder 104 moves to a less complex scene from a more complex scene, it may be able to encode its video output stream at the same visual quality level using fewer bits. Because the complexity of the input videos being processed by each encoder 104 can change over time, the SMC 102 can continuously allocate or re-allocate portions of the target aggregate bitrate for the transport stream 110 to the encoders 104, based on the values of each new need parameter 202 received from each encoder 104.

Each encoder 104 can be configured to encode frames of its input video into an output stream at bitrates equal to, or less than, the bitrate indicated in its most recent bitrate assignment 204. By way of a non-limiting example, when an encoder's bitrate assignment 204 is decreased compared to previous levels, the encoder 104 can decrease encoding quality and sacrifice encoding fine details of its input video in order to decrease the number of bits produced for its output video stream.

In addition to periodically receiving need parameters 202 from the encoders 104, the SMC 102 can also keep track of the actual output bitrate 206 of the output streams being generated by the encoders 104, and/or the actual bitrate of the combined transport stream 110 being sent to client devices 112. As such, the SMC 102 can compare the transport stream's actual total bitrate against the target aggregate bitrate, and/or compare each encoder's actual output bitrate 206 against their bitrate assignments 204. In some embodiments, the SMC 102 can receive the combined transport stream 110 as if it were a client device 112, and use it to decode and analyze individual output streams. In other embodiments, the SMC 102 can receive a copy of output streams directly from the encoders 104. In still other embodiments, the SMC 102 can receive information about the transport stream 110 and/or individual output streams from the multiplexor 108 or client devices 112.

Individual encoders 104 can join or leave the encoder pool 106 at any time. When an encoder 104 is added to the encoder pool 106, the SMC 102 can issue new bitrate assignments 204 to reallocate the target aggregate bitrate for the transport stream 110 across a newly increased number of encoders 104. Similarly, when an encoder 104 is removed from the encoder pool 106, the SMC 102 can issue new bitrate assignments 204 to reallocate the target aggregate bitrate for the transport stream 110 across a newly decreased number of encoders 104.

However, because the encoder pool 106 can be heterogeneous, encoders 104 of different types and configurations can report their need parameters 202 based on different scales or ranges of values. As such, need parameters 202 sent by different encoders 104 that both have the same value may or may not indicate the same video complexity level, such that the SMC 102 may not be able to directly compare them when generating bitrate assignments 204.

In some situations it may be appropriate for the SMC 102 to assign a higher bitrate to one encoder 104 even though both reported the same numerical value for their need parameter 202. By way of a non-limiting example, if a first encoder 104 configured to encode 1080p high definition video and a second encoder 104 configured to encode 480i standard definition video both send the same value for their need parameter 202, the HD encoder 104 may need a higher bitrate to encode what it considers to be a complex scene than the SD encoder 104 does to encode a scene that it considers to be complex, due to the higher number of pixels being processed by the HD encoder 104.

Similarly, in some situations it may be appropriate for the SMC 102 to assign a higher bitrate to an encoder 104 that sent a lower value for its need parameter 202 than another encoder 104. By way of a non-limiting example, when a first encoder 104 sends a need parameter 202 value of "25000" and a second encoder 104 sends a need parameter 202 value of "800," the second encoder's need parameter 202 can actually indicate a higher complexity if it was reported on a scale of 1 to 1000 and the first encoder's need parameter 202 was reported on a scale of 1 to 100,000.

Figure 3:
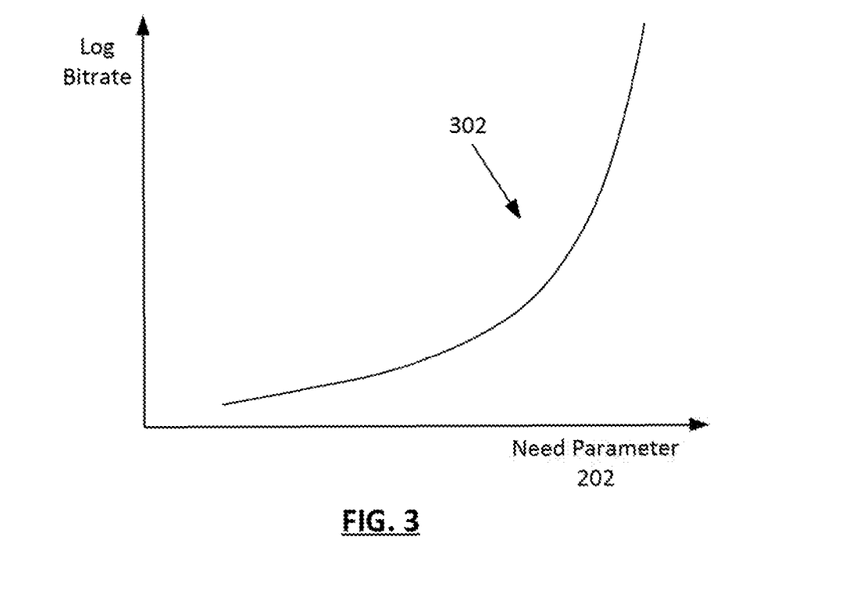
FIG. 3 depicts a non-limiting exemplary embodiment of a mapping curve.

The SMC 102 can maintain one or more mapping curves 302 for each type and/or configuration of encoder 104, as the need parameters 202 from different encoders 104 may not be directly comparable, and different encoders 104 may need different numbers of bits to achieve output streams that have the same visual quality level depending on their type and/or configuration. By way of a non-limiting example, an encoder 104 using an AVC (H.264) codec can often need fewer bits to encode the same scene at the same quality level as another encoder 104 of the same type that is using MPEG2. Each mapping curve 302 can indicate target bitrates to assign to an encoder 104 based on need parameters 202 received from that encoder 104 that would result in an optimal or desired visual quality level. FIG. 3 depicts a non-limiting exemplary embodiment of a mapping curve 302.

In some embodiments the SMC 102 can maintain one mapping curve 302 for each type and/or configuration of encoder 104, such that the mapping curve 302 is generic for any frame type being encoded by the encoder 104. In other embodiments the SMC 102 can maintain multiple mapping curves 302 for each type and/or configuration of encoder 104, with different mapping curves 302 for different frame types such as an I-frames, P-frames, and B-frames. In these embodiments, an encoder 104 can indicate which type of frame it is encoding to the SMC 102 along with its need parameters 202.

The shape of each mapping curve 302 can be substantially similar, with higher values of the need parameter 202 indicating higher bitrates. However, the scales of the actual values for the need parameters and/or bitrates on each axis can vary between mapping curves 302 for different types and/or configurations of encoders 104.

The SMC 102 can thus consult a mapping curve 302 associated with each particular encoder 104 to find a target bitrate to assign to each encoder 104 based on the values of the need parameters 202 they sent, rather than comparing the need parameters 202 directly. By way of a non-limiting example, the mapping curve 302 for a first encoder 104 can indicate that the first encoder's most recent need parameter 202 corresponds to assigning a bitrate of 2800 Kbps to the first encoder 104, the mapping curve 302 for a second encoder 104 can indicate that the second encoder's most recent need parameter 202 corresponds to assigning a bitrate of 2000 Kbps to the second encoder 104, and the mapping curve 302 for a third encoder 104 can indicate that the third encoder's most recent need parameter 202 corresponds to assigning a bitrate of 3500 Kbps to the third encoder 104.

If the total of the target bitrates indicated by the mapping curves 302 for all the encoders 104 in the encoder pool 106 is substantially equal to the target aggregate bitrate, the SMC 102 can send each encoder a bitrate assignment 204 allocating those target bitrates to each encoder 104. However, if the total of the target bitrates indicated by the mapping curves 302 is greater than or less than the target aggregate bitrate by more than a preset threshold amount, the target bitrates indicated by the mapping curves 302 can be decreased or increased before being sent in the bitrate assignments 204, such that the total of the bitrate assignments 204 is substantially equal to the target aggregate bitrate. In some embodiments, each target bitrate can be adjusted by the same percentage to adjust the total assigned bitrate to the target aggregate bitrate. In other embodiments, the encoders 104 can be weighted, such that the bitrate assignments 204 for some encoders 104 are adjusted to a greater degree than others.

Mapping curves 302 for known types and/or configurations of encoders 104 can be pre-loaded into the SMC's memory. However, the SMC 102 can also generate and/or refine mapping curves 302 for previously unknown types and/or configurations of encoders 104 when new encoders 104 attempt to join the encoder pool 106.

Figure 4:
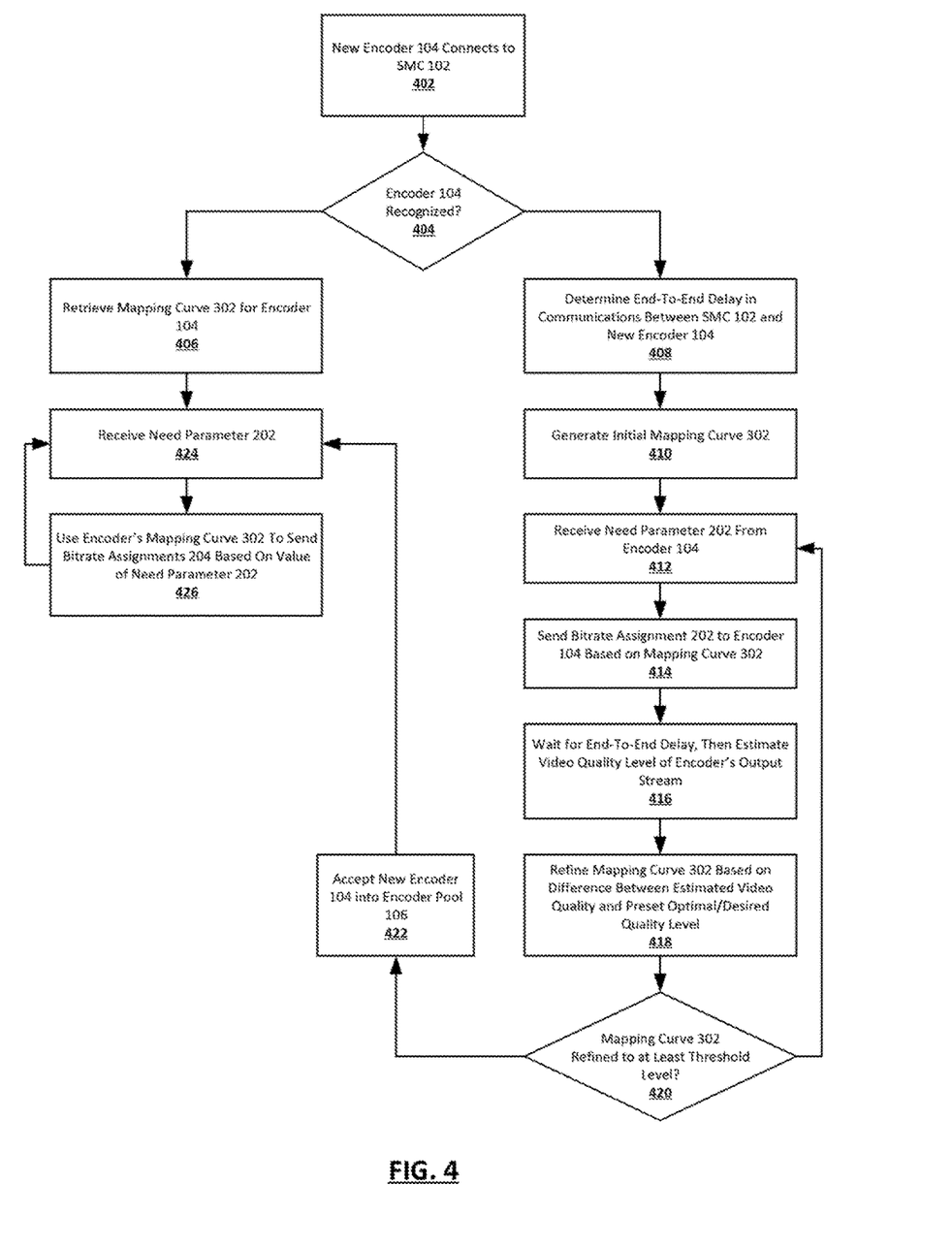
FIG. 4 depicts a process for the SMC to allow recognized or unrecognized encoders to join the encoder pool and have their output streams included in the transport stream.

FIG. 4 depicts a process for the SMC 102 to allow recognized or unrecognized encoders 104 to join the encoder pool 106 and have their output streams included in the transport stream 110. For recognized encoders 104 that request entry into the encoder pool 106, the SMC 102 can load pre-set or previously learned mapping curves 302 for those encoders 104 to generate their bitrate assignments 204. For an unrecognized encoder 104 that requests entry into the encoder pool 106, the SMC 102 can enter a learning phase during which it generates and refines one or more mapping curves 302 for the new, previously unrecognized encoder 104. Once the SMC 102 has refined the mapping curves 302 for the new encoder 104 to within a threshold level, the SMC 102 can allow the new encoder 104 to join the encoder pool 106 and have its output stream multiplexed as part of the transport stream.

At step 402, a new encoder 104 can connect to the SMC 102 and request to join the encoder pool 106. By way of a non-limiting example, in some embodiments the new encoder 104 can connect to the SMC 102 by sending information to a multicast IP address associated with the SMC 102. At the time a new encoder 104 attempts to join the encoder pool 106, it can already be encoding an input video at default or preset quality levels and/or bitrates, and be outputting an output stream that the SMC 102 can receive.

In some embodiments, the new encoder 104 can also send identifying information about the encoder's type and/or configuration. In other embodiments, the SMC 102 can analyze the new encoder's output stream to attempt to determine information about the new encoder's type and/or configuration. By way of a non-limiting example, the SMC 102 can examine the output stream to determine attributes such as the output stream's current bitrate, resolution, and framerate.

At step 404, the SMC 102 can attempt to recognize the new encoder 104. As described above, the SMC 102 can maintain a database or repository of different mapping curves 302 associated with known types and/or configurations of encoders 104. If the new encoder 104 sent identifying information during step 402, or if the SMC 102 can determine the type and/or configuration of the new encoder 104 from its output stream, and if the SMC 102 already has one or more mapping curves 302 for that type and/or configuration of encoder 104, it can load those mapping curves 302 into memory at step 406 before moving to steps 424 and 426 to receive need parameters 202 from the new encoder 104 and respond with bitrate assignments 204 from the loaded mapping curves 302.

However, if the new encoder's type and/or configuration is not recognized by the SMC 102 during step 404, such as if it is a hardware model not previously encountered by the SMC 102 or if it is of a recognized type but it is configured differently than previously encountered encoders 104 of that type, the SMC 102 can move to step 408 and enter a learning mode before allowing the new encoder 104 to join the encoder pool 106 and have its output stream included in the transport stream 110.

At step 408, the SMC 102 can determine the end-to-end delay in communications with the new encoder 104. During this step, the SMC 102 can receive an output video stream generated by the new encoder 104. By way of a non-limiting example, new encoder 104 can have a multicast IP address through which other devices can receive its output stream, and the SMC 102 can receive the new encoder's output stream through that multicast IP address. The SMC 102 can log the amount of bits in the output stream over a preset time period, to track the new encoder's average actual output bitrate 206. By way of a non-limiting example, the SMC 102 can track the new encoder's actual output bitrate 206 over a preset number of seconds or milliseconds.

Once the SMC 102 is tracking the new encoder's average actual output bitrate 206, the SMC 102 can send a series of pulse bitrate change commands to the new encoder 104, with each pulse bitrate change command being separated by time intervals. The pulse bitrate change commands can each instruct the encoder 104 to encode its input video at new bitrates, ranging from a minimum bitrate to a maximum bitrate. The new encoder 104 can accordingly change the bitrate used to encode its input video according to the pulse bitrate change commands sent by the SMC 102, such that its actual output bitrate 206 changes in response to the pulse bitrate change commands.

The SMC 102 can find the end-to-end delay period between the SMC 102 and the new encoder 104 by tracking how long it takes for the output stream received by the SMC 102 to reflect the bitrate changes ordered by the SMC 102. After determining the end-to-end delay period, the SMC 102 can move to step 410.

At step 410, the SMC 102 can generate an initial mapping curve 302 for the new encoder 104. In some embodiments, the initial mapping curve 302 can be a copy of a preset default optimal mapping curve 302 stored in memory at the SMC 102. By way of a non-limiting example, the mapping curve 302 can be an optimal mapping curve 302 previously loaded on the SMC 102 with a curve shape that relates values of the need parameter 202 to bitrates that have been experimentally determined to result in an output stream with optimal or desired visual quality. In other embodiments, the mapping curve 302 can be a copy of a mapping curve 302 previously learned or loaded for a similar type or configuration of encoder 104. By way of a non-limiting example, if the SMC 102 was able to determine from a new encoder's output stream that it is encoding 1080p video at 30 frames per second using a particular codec, the SMC 102 can load a previously generated mapping curve 302 associated with another type of encoder 104 that was also configured to output video with those settings as the initial mapping curve 302. After generating an initial mapping curve 302, the SMC 102 can move to step 412.

At step 412, the SMC 102 can receive a need parameter 202 from the new encoder 104. As described above, the new encoder 104 might use values for the need parameter 202 that are on a different scale or range of values than other encoders 104. After receiving the need parameter 202, the SMC 102 can move to step 414.

At step 414, the SMC 102 can look up a target bitrate associated with the value of the need parameter on the mapping curve 302, and can send that target bitrate to the encoder 104 in a bitrate assignment 204. The SMC 102 can then move to step 416.

At step 416, the SMC 102 can generate an estimate of the video quality of the encoder's output stream after the end-to-end delay following transmission of a bitrate assignment 204. The SMC 102 can estimate the video quality of the received output stream based on an objective computational or mathematical video model that approximates how a viewer would perceive the video quality.

In some embodiments the SMC 102 can use a full reference (FR) method or reduced reference (RR) method of estimating video quality that compares at least some frames in the encoded output stream against reference frames from the original input video to find actual or perceived differences between them, such as using a SSIM (structural similarity) index, PSNR (peak signal-to-noise ratio), MSE (mean squared error), or any other measure of the visual similarity between encoded frames and reference frames. In these embodiments the SMC 102 can receive a copy of the input video being encoded by the encoder 104, such that the SMC 102 can obtain or extract reference frames from the input video. By way of non-limiting example, in some embodiments the SMC 102 can at least temporarily tune in to the input video from the same source that is feeding the input video to the encoder 104.

In other embodiments, the SMC 102 can use a no-reference (NR) method of analyzing video quality in which frames of the encoded output stream are analyzed without reference to the original input video. By way of non-limiting examples, the SMC 102 can use pixel-based methods (NR-P) that decode the output stream and review pixels for types of degradation such as blurring or coding artifacts, parametric/bitstream methods (NR-B) that review the output stream without decoding by looking at elements such as packet headers, motion vectors, and quantization parameters, or hybrid methods (Hybrid NR-P-B) that look at elements of both the received output stream and a decoded version of the output stream.

After estimating the video quality of the output stream during step 416, the SMC 102 can move to step 418 to refine the mapping curve 302. The SMC 102 can compare the estimated video quality level against a preset optimal or desired quality level. If the estimated video quality was lower than the desired or optimal quality level by more than a predetermined threshold amount, the SMC 102 can determine that the bitrate assignment sent during step 414 was too low, and therefore that the target bitrate on the mapping curve 302 was too low for the value of the need parameter received during step 412. The SMC 102 can accordingly refine the mapping curve 302 by increasing the target bitrate on the mapping curve 302 for this value of the need parameter 202. Similarly, if the estimated video quality was higher than the desired or optimal quality level by more than a predetermined threshold amount, the SMC 102 can determine that the bitrate assignment sent during step 414 was too high, and therefore that the target bitrate on the mapping curve 302 was too high for the value of the need parameter received during step 412. The SMC 102 can accordingly refine the mapping curve 302 by decreasing the target bitrate on the mapping curve 302 for this value of the need parameter 202.

Figure 5A:
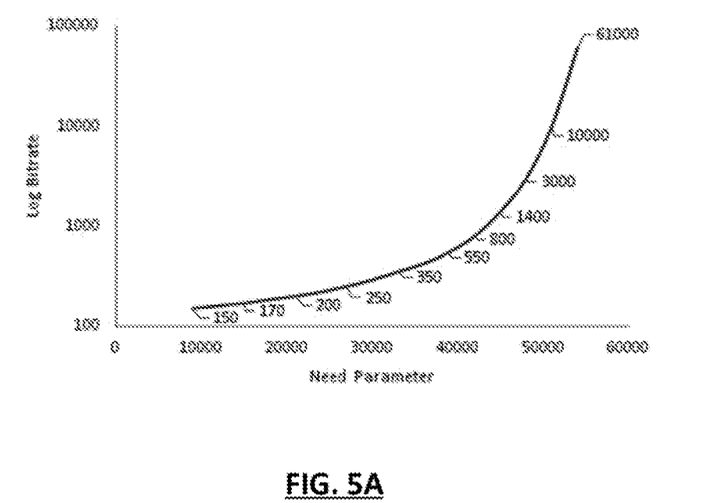
FIGS. 5A-5B depict exemplary mapping curves that are specific to different encoders.
Figure 5B:
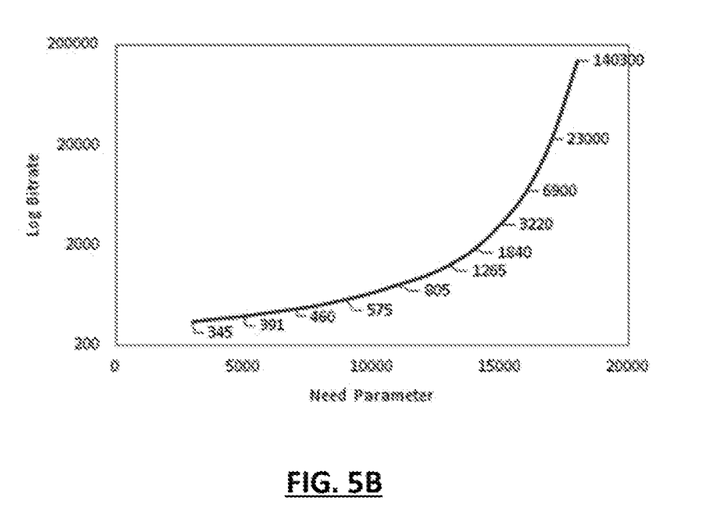

In some embodiments or situations, when the SMC 102 refines the mapping curve 302 by increasing or decreasing the target bitrate for a particular value of the need parameter 202, the SMC 102 can also increase or reduce target bitrates for other values of the need parameter 202. By way of a non-limiting example, if the SMC 102 determines that the target bitrate for one need parameter 202 should be decreased by 25%, it can also similarly decrease other target bitrates for other need parameters 202. The SMC 102 can increase or decrease target bitrates across the mapping curve 302 such that the overall shape of the curve remains substantially similar to the shape of a preset optimal mapping curve 302, although the values and/or scale of the bitrate axis and need parameter axis can change on the refined mapping curve 302. By way of a non-limiting example, FIGS. 5A-5B depict potential exemplary mapping curves 302 curves that can be generated and refined for different types and/or configurations of encoder 104. As shown in FIGS. 5A-5B, the overall curve shape for each encoder's mapping curve 302 can be substantially similar to each other and/or to the curve shape of a preloaded optimal mapping curve 302, while the specific values for the need parameters 202 and target bitrates can differ.

In some embodiments some or all of steps 412 through 418 can be performed for every frame and/or bitrate assignment 204, in other embodiments some of the steps can be performed at regular or irregular intervals. By way of non-limiting examples, in some embodiments the SMC 102 can decode and review the output stream to estimate video quality and refine the mapping curve 302 at selected I-frames, or at every n seconds or minutes.

The SMC 102 can also be at different steps at the same time for different frames. By way of a non-limiting example, at substantially the same point in time the SMC 102 can be receiving a new need parameter 202, be sending out a bitrate assignment 204 in response to a need parameter 202 received earlier, and/or be estimating the video quality and refining the mapping curve 302 after waiting for the end-to-end delay after sending an earlier bitrate assignment 204.

As described above, in some embodiments the SMC 102 can generate and refine a single mapping curve 302 for all frame types for a new encoder 104. In other embodiments, the SMC 102 can be independently refining multiple mapping curves 302 for different frame types for the same encoder 104.

After refining the mapping curve 302, the SMC 102 can move to step 420 to determine whether the mapping curve 302 has been refined sufficiently to at least a threshold level. In some embodiments the SMC 102 can determine during this step whether the mapping curve 302 has been refined such that its curve shape substantially matches the shape of a preset optimal mapping curve 302, and that its refined target bitrates result in estimated video quality levels that are within a threshold percentage of a preset optimal or desired video quality level, across at least a threshold range of bitrates and/or need parameters 202.

Until the mapping curve 302 is found to have been sufficiently refined during step 420, the SMC 102 can repeat steps 412 through 418 multiple times iteratively refine the mapping curve 302 over time by receiving additional need parameters 202 from the encoder 104, sending bitrate assignments 204 based on the refined mapping curve 302, estimating video quality of the encoded output stream, and refining the mapping curve 302.

Once the mapping curve 302 is found to have been sufficiently refined during step 420, the SMC 102 can move to step 422 and fully accept the new encoder 104 into the encoder pool 106, such that new encoder's output stream can be included in the combined transport stream 110 along with other output streams from other encoders 104 in the encoder pool 106. The SMC 102 can then move to steps 424 and 426 to accept need parameters 202 from encoders in the encoder pool, and respond with bitrate assignments 204 containing target bitrates associated with the received need parameters 202 from customized mapping curves 302 maintained for each type and/or configuration of encoder.

In some embodiments, the SMC 102 can continue looping through steps 412 through 418 for an encoder 104 that has already been accepted into the encoder pool 106, to over refine the shape of its mapping curve over time to be closer and closer to the shape of the optimal mapping curve, and/or to narrow in on more exact target bitrates for each possible value of the encoder's need parameters 202. By way of a non-limiting example, in some embodiments the SMC 102 can allow new encoders 104 to join the encoder pool 106 once it refines a mapping curve 302 for that encoder 104 to above a threshold level, but continue to refine its mapping curve 302 closer to an optimal level over time.

In operation, the SMC 102 can load mapping curves 302 for known encoders 104, and/or generate and refine new mapping curves 302 for new encoders 104. The SMC 102 can use the mapping curves 302 assign bitrates to each encoder 104 in the encoder pool 106 based on need parameters 202 received from the encoders 104, regardless of the type or configuration of each encoder 104.

Although the present invention has been described above with particularity, this was merely to teach one of ordinary skill in the art how to make and use the invention. Many additional modifications will fall within the scope of the invention, as that scope is defined by the following claims.

The invention claimed is:

1. A method of statistical multiplexing digital video, comprising:
    loading a mapping curve into memory at a statistical multiplexor controller for each of a plurality of encoders in a heterogeneous encoder pool, each said mapping curve being specific to a type and/or configuration of encoder and associating target bitrates with need parameter values;
    receiving a need parameter value at said statistical multiplexor controller from each encoder in said heterogeneous encoder pool;
    determining a target bitrate associated with each need parameter value received at said statistical multiplexor controller, by looking up target bitrates for each need parameter on mapping curves specific to each encoder in said heterogeneous encoder pool;
    sending said target bitrate from said statistical multiplexor controller to each encoder in said heterogeneous encoder pool in a bitrate assignment;
    generating, with said statistical multiplexor controller, a new mapping curve for a new encoder when said new encoder is not recognized by said statistical multiplexor controller, by copying a default mapping curve;
    sending bitrate assignments to said new encoder with target bitrates associated with need parameter values received from said new encoder on said new mapping curve;
    determining an estimated video quality level of said new encoder's output stream with said statistical multiplexor controller, using an objective computational video model; and
    refining said new mapping curve when the estimated video quality level of the encoder's output stream is higher or lower than a predefined optimal level, by increasing or decreasing the target bitrate for particular need parameter values on said new mapping curve.

2. The method of claim 1, further comprising adjusting said target bitrate for each encoder such that a sum of target bitrates sent in bitrate assignments is substantially equal to a total aggregate bitrate.

3. The method of claim 1, wherein said heterogeneous encoder pool comprises remote encoders in data communication with said statistical multiplexor controller over a network.

4. The method of claim 1, wherein said heterogeneous encoder pool comprises a plurality of encoders of different types and/or configurations.

5. The method of claim 1, further comprising determining an end-to-end delay in communications between said statistical multiplexor controller and said new encoder, and determining said estimated video quality level after waiting for said end-to-end delay following sending a bitrate assignment.

6. The method of claim 1, wherein said default mapping curve is an optimal mapping curve previously provided to said statistical multiplexor controller.

7. The method of claim 1, wherein said default mapping curve is an existing mapping curve stored at said statistical multiplexor controller for an encoder of a similar type and/or configuration as said new encoder.

8. A statistical multiplexing system, comprising:
    a plurality of encoders in a heterogeneous encoder pool configured to accept encoders of any type and/or configuration, each of said plurality of encoders being configured to encode a different input video into an output stream;
    a statistical multiplexor controller in remote and/or direct communication with each of said plurality of encoders, said statistical multiplexor controller being configured to:
        load a mapping curve specific to each of said plurality of encoders that relates target bitrates to need parameter values;
        receive need parameters from each of said plurality of encoders that indicate a complexity level of the encoder's input video;
        send a bitrate assignment to each of said plurality of encoders in response to receipt of a need parameter, each bitrate assignment indicating a target bitrate from a particular mapping curve specific to a particular encoder that is associated with a particular need parameter value received from that particular encoder;
        generate a new mapping curve for a new encoder that was previously unknown to the statistical multiplexor controller by copying a default mapping curve;
        send bitrate assignments to said new encoder with target bitrates associated with need parameter values received from said new encoder on said new mapping curve;
        determine an estimated video quality level of said new encoder's output stream, using an objective computational video model; and
        refine said new mapping curve when the estimated video quality level of the encoder's output stream is higher or lower than a predefined optimal level, by increasing or decreasing the target bitrate for particular need parameter values on said new mapping curve.

9. The statistical multiplexing system of claim 8, further comprising a multiplexor configured to receive the output streams from each of said plurality of encoders and combine them into a transport stream sent to one or more downstream decoding devices.

10. The statistical multiplexing system of claim 8, wherein said statistical multiplexor controller is configured to adjust said target bitrate for each encoder such that a sum of target bitrates sent in bitrate assignments is substantially equal to a total aggregate bitrate.

11. The statistical multiplexing system of claim 8, wherein said statistical multiplexor controller is further configured to determine an end-to-end delay in communications between said statistical multiplexor controller and said new encoder, and determine said estimated video quality level after waiting for said end-to-end delay following sending a bitrate assignment.

12. The statistical multiplexing system of claim 8, wherein said default mapping curve is an optimal mapping curve previously provided to said statistical multiplexor controller.

13. The statistical multiplexing system of claim 8, wherein said default mapping curve is an existing mapping curve stored at said statistical multiplexor controller for an encoder of a similar type and/or configuration as said new encoder.

* * * * *